US008582769B2

(12) United States Patent
Zhao et al.

(10) Patent No.: US 8,582,769 B2
(45) Date of Patent: Nov. 12, 2013

(54) SECURE COMMUNICATION OVER PASSIVE OPTICAL NETWORK (PON) WITH QUANTUM ENCRYPTION

(75) Inventors: Yi Zhao, Toronto (CA); Martin Roetteler, East Windsor, NJ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 372 days.

(21) Appl. No.: 12/846,915

(22) Filed: Jul. 30, 2010

(65) Prior Publication Data

US 2011/0182428 A1 Jul. 28, 2011

Related U.S. Application Data

(60) Provisional application No. 61/250,171, filed on Oct. 9, 2009.

(51) Int. Cl.
*H04K 1/00* (2006.01)
(52) U.S. Cl.
USPC .......................................................... 380/256
(58) Field of Classification Search
USPC .......................................................... 380/256
See application file for complete search history.

(56) References Cited

U.S. PATENT DOCUMENTS

| 2006/0051100 A1* | 3/2006 | Watanabe ...................... 398/152 |
| 2006/0093376 A1* | 5/2006 | Mitchell et al. ............... 398/183 |
| 2011/0019823 A1* | 1/2011 | Townsend ..................... 380/256 |

OTHER PUBLICATIONS

Gilles Brassard, et al., Entanglement and Wavelength Division Multiplexing for Quantum Cryptography Networks, Quantum Comm., Measurement and Computing, edited by S.M.Barnett et al., 2004 American Inst. of Physics, pp. 323-326.
Gilles Brassard, et al., Multi-User Quantum Key Distribution Using Wavelength Division Multiplexing Proceedings of SPIE vol. 5260 Applications of Photonic Technology 6, edited by Roger A. Lessard, Georges A. Lampropoulos (SPIE, Bellingham, WA, 2003) • 0277-786X/03/$15.00.
D. Stucki, et al., Quantum key distribution over 67 km with a plug &play system, *New Journal of Physics* 4 (2002) 41.1-41.8 (http://www.njp.org/)Received Mar. 7, 2002,Published Jul. 12, 2002.

* cited by examiner

*Primary Examiner* — Philip Chea
*Assistant Examiner* — Daniel Hoang
(74) *Attorney, Agent, or Firm* — Joseph Kolodka (57) ABSTRACT

Systems and methods to communicate securely includes communicating quantum encryption data on a first wavelength-division multiplexing passive optical network (WDM-PON); and communicating data over separate classical channels of a second WDM-PON, wherein the second WDM-PON synchronizes with the first WDM-PON while providing data communication over the classical channels.

21 Claims, 5 Drawing Sheets

SECURE COMMUNICATION OVER PASSIVE OPTICAL NETWORK (PON) WITH QUANTUM ENCRYPTION

This application claims priority to U.S. provisional patent application Ser. No. 61/250,171 filed Oct. 9, 2009, the content of which is incorporated by reference.

BACKGROUND

The application relates to secure communication over a passive optical network.

Quantum key distribution (QKD) provides a secure communication between two legitimate users: Alice (a sender) and Bob (a receiver). Its security is proved to be unconditional based on the fundamental laws of physics. It is natural to extend QKD from the point-to-point setting to a network setting. There can be many schemes to implement QKD in a network. One appealing scheme is to integrate QKD in a passive-optical-network (PON).

Figure 1:
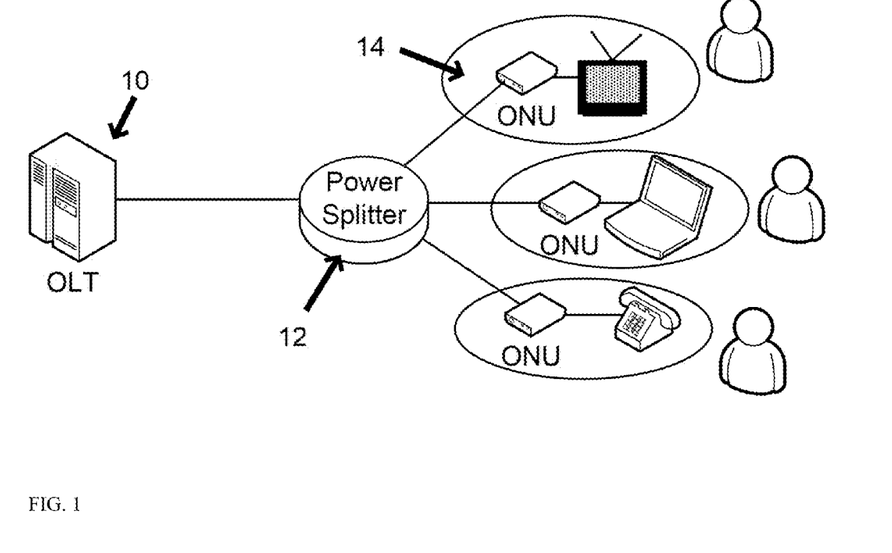
FIG. 1 shows an exemplary PON.

Recently, PON has attracted much interest as an inexpensive and efficient solution to the "last mile link", or access network. FIG. 1 shows an exemplary PON. An Optical Line Terminal (OLT) 10 broadcasts a data stream over a power splitter 12 to several Optical Network Units (ONUs) 14. The data stream is passively routed to ONUs 14 using techniques such as the Time Domain Multiplexing (TDM), the Wavelength Domain Multiplexing (WDM), and the Orthogonal Frequency Domain Multiplexing (OFDM).

Most current quantum crypto systems are based on point-to-point scheme. It is important to find a solution that can extend the quantum cryptography technology into a network setting. Passive optical network (PON) provides an ideal network platform that has the potential to supply quantum encryption. It has attracted much academic and industrial interest to integrate the quantum cryptography technology with PON. This integration will substantially improve the accessibility of quantum encryption, which can provide the highest communication security for real-life applications.

In TDM, the OLT assigns each ONU a specific time slot. During each time slot, the data broadcasted by the ONU is dedicated for the allocated user. The data stream broadcasted by the OLT is passively splitted by an optical splitter. As a result, each ONU sees the entire stream. The ONU picks up the correct data section that is assigned to the user.

Figure 2A:
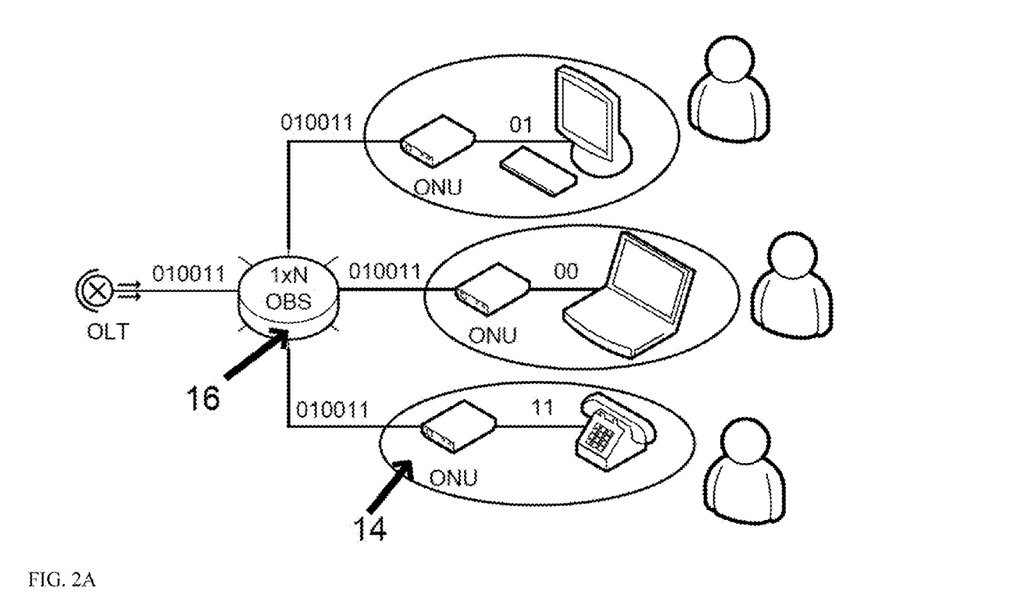
FIG. 2A shows an exemplary TDM PON with an optical beam splitter (OBS).
Figure 2B:
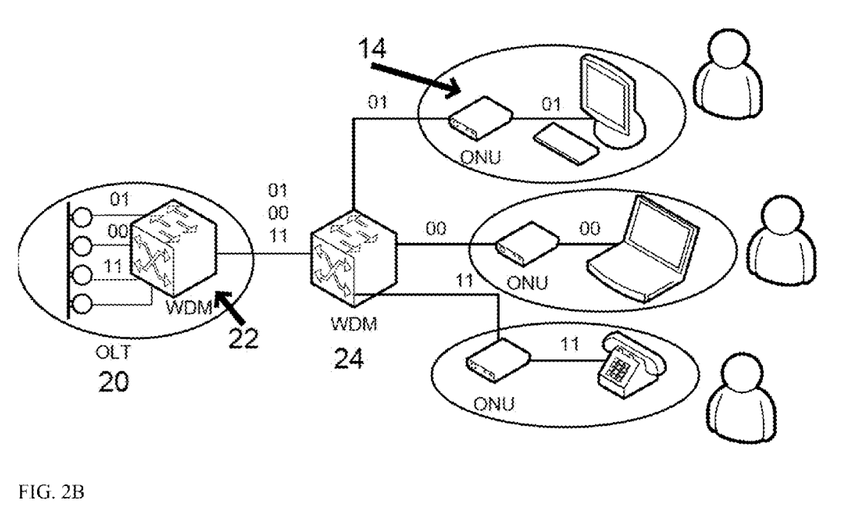
FIG. 2B shows an exemplary WDM-PON where each user is assigned a unique wavelength.

FIG. 2A shows an exemplary TDM PON with an optical beam splitter (OBS) 16. One issue with the TDM-PON is that each user's bandwidth will decrease as the number of users in the PON increases. An alternative implementation is to use the wavelength-division multiplexing (WDM) technique. FIG. 2B shows an exemplary WDM-PON where each user is assigned a unique wavelength. An OLT 20, which includes an array of transceivers at different wavelengths multiplexed with WDM 22, communicates with other WDMs 24 and with multiple transceivers at the ONU side. Each transmitter has a dedicated ONU 14. The signals from all the transmitters are combined into the same channel with a WDM 24, and routed to different users with another WDM 22.

Integrating quantum encryption with PON has been done by distributing the secure keys in a down-stream (i.e., from server to users), uni-directional (i.e., the server generates a signal, then sends it to a user), and time-domain multiplexing (TDM) fashion. Down-stream key distribution requires that each user possesses a pair of single photon detectors (SPDs) which are expensive. Moreover, in such a scheme, upgrading the network (i.e., increasing the bandwidth) requires that each user has to replace his/her pair of SPDs. Therefore, the down-stream key distribution is expensive in initial deployment and future upgrading. Uni-directional key distribution requires active optical alignment compensation for the phase drift and the polarization dispersion. This active compensation will reduce the overall duty cycle and increase the operating complexity.

There are various QKD protocols, and among these protocols, BB84, B92, and E91 are proved to be unconditionally secure. However, implementing B92 protocol requires accurate intensity monitoring, while E91 protocol requires an entanglement source. Therefore, among these three protocols, BB84 is most widely implemented and is most mature. The BB84 protocol can be used with double Mach-Zehnder interferometer (MZI), Faraday-Michelson interferometer (FMI), and Plug-and-Play (PnP) structures. Other BB84 implementation structures (such as free-space structure, fiber-based polarization coding structure, among others) can be used as well.

Figure 2C:
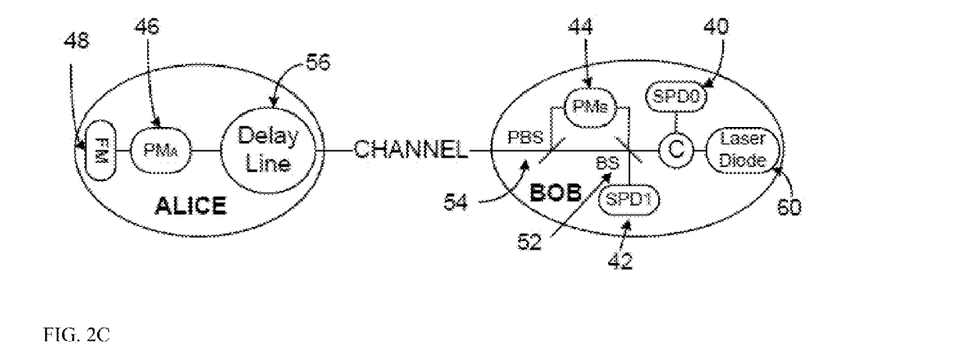
FIG. 2C shows one embodiment with the PnP structure where the polarization-drift in the channel is compensated by the bi-directional structure and the Faraday rotation.

FIG. 2C shows one embodiment with the PnP structure where the polarization-drift in the channel is compensated by the bi-directional structure and the Faraday rotation. The phase drift in local MZI is also compensated by the bi-directional structure. FIG. 2C shows a schematic of PnP QKD with Single Photon Detector (SPD) 40, 42; Phase Modulator (PM) 44, 46; Faraday Mirror (FM) 48; Circulator (C) 50; Beam Splitter (BS) 52; Polarizing Beam Splitter (PBS) 54 and a delay line 56. In network applications, a significant advantage for PnP QKD is that both the laser source 60 and the detectors are in Bob's side, making Alice's apparatus very simple. In network environment, especially PON which is in server-user scheme, PnP will allow multiple users (Alice) to share a server (Bob).

To accommodate PnP implementation, WDM has significant advantage by minimizing channel loss. This is because, in TDM, the channel loss will increase as the number of users increases. However, the output intensity at each user's side cannot increase much due to the security requirement. This can substantially reduce the efficiency of QKD.

SUMMARY

In a first aspect, a secure communication system includes a first wavelength-division multiplexing passive optical network (WDM-PON) to perform quantum encryption, the first WDM-PON providing quantum channels for quantum encryption; and a synchronization unit having a second WDM-PON to synchronize with the first WDM-PON and to provide separate classical channels for data communication.

In a second aspect, a method to communicate securely includes communicating quantum encryption key data on a first wavelength-division multiplexing passive optical network (WDM-PON); and communicating data over separate classical channels of a second WDM-PON, wherein the second WDM-PON synchronizes with the first WDM-PON while providing data communication over the classical channels.

Advantages of the preferred embodiment may include one or more of the following. The system provides a user-friendly cost-efficient QKD scheme which is based on WDM-PON. Other advantages may include a simple ONU—very few components are needed on the user's side, most of which are passive. The system is user-friendly—the design is self-stabilized and users have minimal calibration/alignment hassles. The system is cost efficient. The most expensive components—the single photon detectors (SPDs)—are located in the server and are shared by all the users. The system is easy to upgrade. The major bottleneck of the performance of a QKD system is the poor performance of the SPDs. In the preferred embodiment, the SPDs are situated in the server. A simple upgrading of the SPDs at the server side can provide users a substantial bandwidth increase because all the components at the users' sides can easily work at high speed. The system experiences minimal crosstalk between quantum and classical channels through a dedicated optical fiber for the quantum signal, physically separating the quantum and the classical signals. Full compatibility with classical data communication is achieved. If a user chooses to perform classical communication with the server, the synchronization processing system can be used as the classical communication system. The system is fully compatible with classical data communication in addition to quantum communication. The system has a separate synchronization sub-system. This sub-system is capable of broadband classical data communication if some user does not request the quantum encryption. Additionally, the system is more robust against environmental change. Environmental change will have similar effects on both the classical and the quantum channels. Therefore, the relative change between the two channels is very small. Moreover, the system is fast and efficient. The down-stream quantum signals in the system can be very weak because the system has a dedicated synchronization channel. Therefore, the backscattering from the downstream quantum signals is negligible. The system is less expensive from the user's side. Since the backscattering from the down-stream quantum signals is negligible, there is no need to install a long fiber loop at the user's side to reduce the backscattering. Additionally, the system exhibits minimum leakage from the classical data signals to the quantum signals. A dedicated optical fiber is used for the quantum signal, separating the quantum and the classical signals physically. The system does not need an attenuator on the user's side because it uses dim down-stream quantum signals, whose backscattering is negligible. Moreover, each user can switch between the quantum communication and the classical data communication freely without interfering other user's communication. In one embodiment, an array of quantum transmitters is used to improve the system operating speed by including more SPDs in the server. The number of SPDs does not need to be proportional to the number of users.

DESCRIPTION

Figure 3:
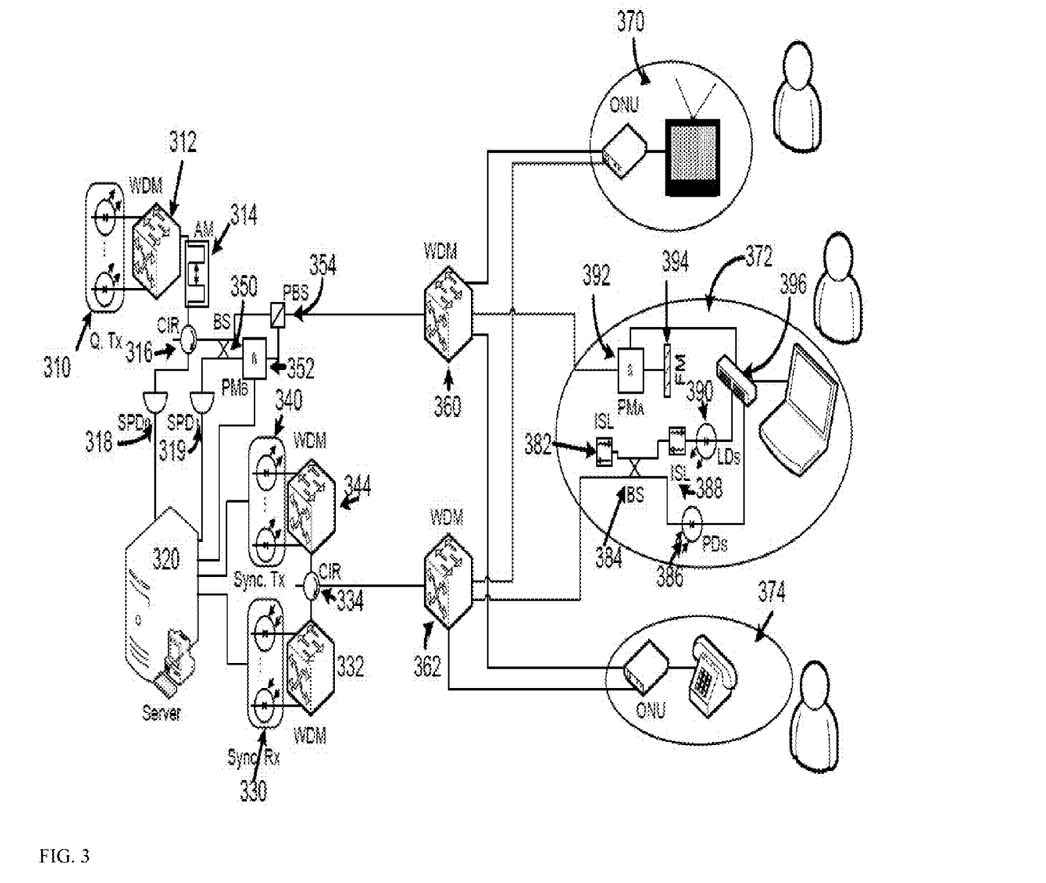
FIG. 3 shows a hybrid PON that supports both quantum and classical communications.

FIG. 3 shows a hybrid PON that supports both quantum and classical communications. The dedicated classical communication sub-system can improve the performance of the quantum communication subsystem. The system can establish a secure communication network among 16-64 users, which is a typical PON capacity. A satisfactory (secure) key generation rate can be done when the distance between the server and the users is between 20 km and 40 km, which is a typical server-user distance for most PONs.

The system of FIG. 3 has a quantum transmitter 310 communicating with a WDM 312. The WDM 312 output is provided to an amplitude modulator 314 and then to a circulator 316. The output is also provided to a beam splitter 350 and goes to single photon detectors 318 and 319. The beam splitter 350 is also connected to a phase modulator 352 and a polarizing beam splitter 354. The polarizing beam splitter 354 is connected to a WDM 360.

The single photon detectors 318, 319 and phase modulator 352 are connected to a server 320. The server 320 also is connected to a synchronization receiver 330 and transmitter 340. The synchronization transmitter 340 is connected to a WDM 344, while the synchronization receiver 330 is connected to a WDM 332. The WDMs 332 and 344 are connected to a circulator 334, which in turn is connected to a WDM 362.

The WDM 360 and 362 are connected to a plurality of end user systems 370, 372 and 374 with ONUs. In the exemplary system 372, the WDM 360 is connected to a phase modulator 392 which is connected to a Faraday mirror 394 and to terminal 396. The terminal 396 is connected to laser devices 390. The WDM 362 is connected to a beam splitter 384 to the laser devices 390 or photon detectors 386. Isolators 382 and 388 are also provided.

In the system of FIG. 3, the quantum signals are very weak and is thus very fragile to the leakage from the synchronization signals. A dedicated fiber is used for the transmission of the quantum signals. This dedicated fiber can eliminate any possible leakage from the synchronization signals to the quantum signals. In WDM-PON, the server 320 possesses many transmitters, each has a unique wavelength that is assigned to a user. In this way, the server 320 can determine to which user a message will be sent.

A dedicated continuous wave quantum transmitter is used for each user. The output from different transmitters are combined into the same fiber with a WDM. The combined broadband continuous wave is then chopped into pulses by an amplitude modulator. A dedicated synchronization laser source is assigned for each user. This synchronization laser source can easily work as a classical downstream transmitter if the quantum communication is not requested. The broadband signals generated by the source is routed to the users according to their wavelengths. The signals are then sent back from users to the server. The user's message will be decoded by the MZI in the server, and then read out by single photon detectors (SPDs).

To determine which user sent the server 1 bit of information, the system relies on a signal tracing method that makes use of the synchronization sent from the user to the server. The synchronization signal is needed to trigger the SPDs. By setting the synchronization signals from the users to different wavelengths, the server can discriminate "who sends the signal".

The fiber length for each user has to be set differently. This is because if several synchronization signals from different users arrive at the server simultaneously, and the server's SPD clicks, the server cannot tell which user's photon was detected by the SPD.

During operation, the quantum transmitters 310 generate continuous wave laser beams at different frequencies. The output from the quantum transmitters 310 are sent into the same fibre with the WDM 312. The combined output beam is shaped into pulses at a repetition rate $f_{rep}$ with an amplitude modulator. For each quantum pulse generated, each synchronization transmitter 340 sends an accompanying synchronization signal. Each user may have a unique fiber length mismatch between the quantum fiber and the classical fiber. The delay time between the emission of a quantum signal and the emission of an accompanying synchronization signal dedicated for certain user should be calibrated accordingly. The quantum signal and the synchronization signals are sent to the local hubs (WDMs 360 and 362). Each user is assigned a quantum signal and a synchronization signal. The user's photo diode ($PD_S$ 386) detects the synchronization signal, and triggers user's phase modulator ($PM_A$ 392) to encode the quantum information. The encoded quantum signal is reflected by the Faraday mirror 394.

The user sends out a synchronization signal with the laser diode ($LD_S$ 390). When the returning signals arrive at the server, the quantum signals are sent the to MZ, while the synchronization signals are sent to the WDM 332. The synchronization signals are then splitted according to their wavelengths. Each user's synchronization signal is sent to a designated photo diode. The detection signal from the photo diode will trigger the server's phase modulator and single photon detectors. If one of the single photon detector clicks, the server 320 records its bit value and its sender.

Due to the bi-directional nature of the system, an incoming encoded quantum signal (from a user to the server) and an outgoing non-encoded quantum signal (for the server to a user) can enter the server's phase modulator simultaneously. The server's phase modulation on the returning signal can also exert a phase modulation on the foregoing signal. The signal overlapping should be considered in the data processing. That is, the server and the user should factor in this additional phase modulation when calculating the resulting Quantum Bit Error Rate (QBER).

The security of the system is not affected by this possible overlap of incoming and outgoing signals. This additional phase modulation may be learned by the eavesdropper when the strong outgoing signals are modulated by the phase modulator and sent to the users, which reveals the server's measurement basis. However, this information leakage would be after the measurement, and the server is expected to broadcast its measurement basis after the receipt of the incoming signal.

The key exchange in PnP QKD includes two stages: First, the server sends strong pulses to the user; second, the user sends back encoded weak signals to the server. The backscattering from the first stage, especially due to Rayleigh scattering, may increase the background detection rate. More concretely, when the strong pulses were sent from the server to the user, some photons in these strong pulses may be scattered back due to Rayleigh scattering. These backscattered photons may overlap with the signal photons propagating from the user to the server in the time domain. Therefore, some detection events from the single photon detectors (SPDs) in the server may originate from these backscattered photons rather than the signal photons. Such increase of background detection rate will increase QBER.

In one embodiment, the SPD bandwidth is shared by multiple users. Therefore, the bandwidth each user can have is affected by the number of users. In the WDM scheme, the power splitter's transmittance $\eta_{WDM}$ is independent of the number of users. Therefore, if there are in total n users sharing the bandwidth, the bandwidth each user can get is 1/n of the single user case. Note that, the leakage between different wavelengths in the quantum signals does not affect the performance. In the TDM scheme, the power splitter's transmittance $\eta_{TDM}=\eta_{BS}/n$ is inversely proportional to the number of users, n. The channel loss is expected to be high when a large number of users are sharing the bandwidth. Intuitively, if there are in total n users sharing the bandwidth, the bandwidth each user can get is $1/n^2$ of the single user case.

Next, the determination of the length difference for fibers connecting the server and different users is discussed. For m users, each user is connected with the server via a fiber link $l_i$ ($i \in [1,m]$). If $\forall i \in [1,m-1]$, $l_i < l_{i+1}$ and $$T(l) = \frac{2l}{nc}, \quad (1)$$

where l is the length of fiber connecting the server and the user, n is the refractive index of fiber, and c is the speed of light. A round-trip for a signal to travel between the server and the ith user will take a time $T(l_i)$.

The length difference for the fibers connecting the server and different users should be large enough such that the corresponding delay time difference is larger than the timing resolution of SPDs. That is, assuming that the minimum separation time between adjacent gating signals of the SPDs is $t_{res}$, we have to make sure that $\forall i \in [1,m-1]$, $T(l_{i+1}-l_i) \geq t_{res}$.

The entire time span $T(l_m-l_1)$ of all the m synchronization signals that correspond to the same signal sent by the server should not beyond the pulse repetition period of the laser source so as to avoid mis-counting (this is actually not necessary, if the server can keep record of the arrival times of all the synchronization signals). In other words, if the source at the server generates pulses at a repetition rate $f_{rep}$, one has to make sure that $T(l_m-l_1) < 1/f_{rep}$. The pulse repetition rate is largely determined by the properties of the SPDs. There are two crucial parameters of the SPDs: the timing resolution $t_{res}$ and the counting rate $f_{cnt}$. Usually $t_{res}=1/f_{cnt}$. Therefore, one can set $f_{rep}:f_{cnt}$.

The system of FIG. 3 is an up-stream quantum key distribution network that adopts a "plug & play" scheme on top of a WDM-PON. One pair of SPDs is installed, and is shared by all the users, which substantially reduces the costs for the initial deployment and the following upgrades. A dedicated synchronization system is included in one embodiment, which enables broadband classical data transmission between the server and a user who occasionally does not request the quantum encryption. The bright synchronization signals will not leak into the weak quantum signals because they are physically separated. This system is highly user-friendly because no optical alignment is required.

Figure 4:
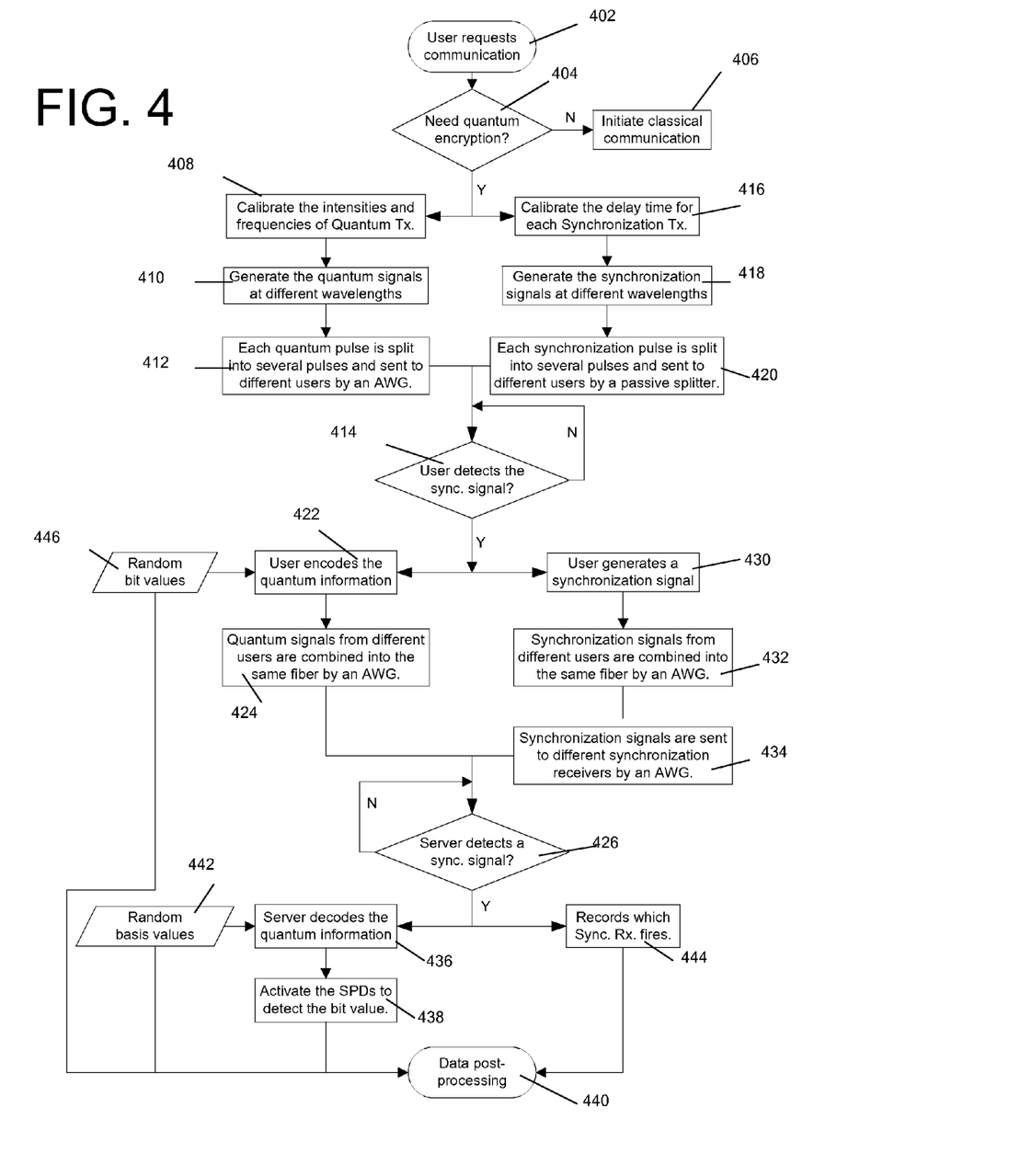
FIG. 4 shows an exemplary system operation flow chart when a user requests communication.

FIG. 4 shows an exemplary system operation flow chart when a user requests communication (402). First, the process checks whether quantum encryption is needed (404). If not, classical communication methods are initiated (406). Alternatively, the system calibrates the intensities and frequencies of the quantum transmission (408) and also calibrates the delay time for each synchronization transmission (416). From 408, the process generates quantum signals at different wavelengths (410) and each quantum pulse is split into several pulses and sent to different users by an Arrayed Waveguide Grating (AWG) (412). From 416, the process generates synchronization signals at different wavelengths (418) and each synchronization pulse is split into several pulses and sent to different users by a passive splitter (420). From 412 or 420, the process checks if the user detects the synchronization signal (414) and waits until the synchronization signal is detected before proceeding.

From 414, the user encodes the quantum information (422) and the user also generates a synchronization signal (430). Random bit values are provided to the quantum encoding (446) and to post processing operation 440. From 422, the quantum signals from different users are combined into the same fiber by an AWG (424). From 430, the sync signals from different users are combined into the same fiber by an AWG (432) and the sync signals are sent to different synchronization receivers by an AWG (434).

From 424 or 434, the process waits until the server detects a synchronization signal (426). Once the synchronization signal is detected, the server decodes the quantum information (436) and then activates the appropriate SPDs to detect the bit value (438). Random basis values are provided to the quantum information decoding (442). From 426, the server also records which synchronization receiver has fired (444).

The system provides a user-friendly cost-efficient QKD scheme which is based on WDM-PON. Other advantages may include a simple ONU—very few components are needed on the user's side, most of which are passive. The system is user-friendly—the design is self-stabilized and users have minimal calibration/alignment hassles. The system is cost efficient. The most expensive components—the single photon detectors (SPDs)—are located in the server and are shared by all the users. The system is easy to upgrade. The major bottleneck of the performance of a QKD system is the poor performance of the SPDs. In the preferred embodiment, the SPDs are situated in the server. A simple upgrading of the SPDs at the server side can provide users a substantial bandwidth increase because all the components at the users' sides can easily work at high speed. The system experiences minimal crosstalk between quantum and classical channels through a dedicated optical fiber for the quantum signal, physically separating the quantum and the classical signals.

Full compatibility with classical data communication is achieved. If a user chooses to perform classical communication with the server, the synchronization processing system can be used as the classical communication system. The system is fully compatible with classical data communication in addition to quantum communication. The system has a separate synchronization sub-system. This sub-system is capable of broadband classical data communication if some user does not request the quantum encryption. Additionally, the system is more robust against environmental change. Environmental change will have similar effects on both the classical and the quantum channels. Therefore, the relative change between the two channels is very small. Moreover, the system is fast and efficient.

The down-stream quantum signals in the system can be very weak because the system has a dedicated synchronization channel. Therefore, the backscattering from the down-stream quantum signals is negligible. The system is less expensive from the user's side. Since the backscattering from the down-stream quantum signals is negligible, there is no need to install a long fiber loop at the user's side to reduce the backscattering. Additionally, the system exhibits minimum leakage from the classical data signals to the quantum signals. A dedicated optical fiber is used for the quantum signal, separating the quantum and the classical signals physically. The system does not need an attenuator on the user's side because it uses dim down-stream quantum signals, whose backscattering is negligible. Moreover, each user can switch between the quantum communication and the classical data communication freely without interfering other user's communication. In one embodiment, an array of quantum transmitters is used to improve the system operating speed by including more SPDs in the server. The number of SPDs does not need to be proportional to the number of users.

In another embodiment, only one phase modulator is needed since typical phase modulators can work at a much higher frequency than that of the SPDs. Therefore, one phase modulator can support many SPDs. Further, the number of SPDs can be flexibly chosen between two and twice as many as the number of the users.

The invention may be implemented in hardware, firmware or software, or a combination of the three. Preferably the server is a programmable computer having a processor, a data storage system, volatile and non-volatile memory and/or storage elements, at least one input device and at least one output device.

By way of example, a server computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A secure communication system, comprising
    a first wavelength-division multiplexing passive optical network (WDM-PON) to perform quantum encryption, the first WDM-PON providing quantum channels for quantum encryption; and
    a synchronization device having a second WDM-PON to synchronize with the first WDM-PON and to provide separate classical channels for data communication,
    a server coupled to the first and second WDM-PONs; and
    computer readable storage medium configured with a program to determine length difference for fibers connecting the server and different users, where for m users, each user is connected with the server via a fiber link $l_i$ ($i \in [1,m]$), and $\forall i \in [1,m-1]$, $l_i < l_{i+1}$:

$$T(l) = \frac{2l}{nc},$$

where l is a length of fiber connecting the server and a user, n is a refractive index of fiber, and c is a speed of light, and $T(l_i)$ represents a round-trip time for a signal to travel between the server and i th user.

2. The system of claim 1, wherein a time span $T(l_m-l_1)$ of all m synchronization signals that correspond to one signal sent by the server is less then a pulse repetition period of a laser source.

3. The system of claim 1, comprising an array of quantum transmitters to generate continuous wave laser beams at different frequencies.

4. The system of claim 2, wherein outputs from the quantum transmitters are combined into one fibre with a WDM.

5. The system of claim 2, wherein the combined output beam is shaped into pulses at a repetition rate with an amplitude modulator.

6. The system of claim 1, comprising a user photo diode to detect the synchronization signal and trigger a user phase modulator to encode quantum information.

7. The system of claim 1, wherein each user is associated with a unique fiber length mismatch between a quantum fiber and a classical fiber.

8. The system of claim 1, wherein the synchronization unit provides up-stream and down-stream synchronization.

9. The system of claim 1, wherein the synchronization unit sends a synchronization signal from each synchronization transmitter for each quantum pulse generated.

10. The system of claim 1, wherein the synchronization unit calibrates a delay time between an emission of a quantum signal and an emission of a synchronization signal dedicated for a user.

11. The system of claim 1, wherein quantum signals and synchronization signals are sent to a local hub.

12. The system of claim 1, wherein each user is assigned a quantum signal and a synchronization signal.

13. The system of claim 1, comprising a Faraday mirror to reflect an encoded quantum signal.

14. The system of claim 1, comprising a splitter to separate synchronization signals according to wavelengths.

15. The system of claim 1, wherein a synchronization signal from each user is sent to a designated photo diode.

16. The system of claim 1, comprising a server having a phase modulator and single photon detector triggered by a detection signal from a photo diode, wherein the server records a bit value and a sender if one of the single photon detector clicks.

17. A method to communicate securely, comprising:
communicating quantum encryption key data on a first wavelength-division multiplexing passive optical network (WDM-PON);
communicating data over separate classical channels of a second WDM-PON, wherein the second WDM-PON synchronizes with the first WDM-PON while providing data communication over the classical channels; and
determining a length difference for fibers connecting the server and different users, where for m users, each user is connected with the server via a fiber link $l_i$ (i∈[1,m]), and ∀i∈[1,m−1], $l_i < l_{i+1}$:

$$T(l) = \frac{2l}{nc},$$

where l is a length of fiber connecting the server and a user, n is a refractive index of fiber, and c is a speed of light, and $T(l_i)$ represents a round-trip time for a signal to travel between the server and i th user.

18. The method of claim 17, comprising calibrating intensity and frequency of a quantum transmission.

19. The method of claim 17, comprising calibrating a delay time for each synchronization transmission.

20. The method of claim 17, comprising combining quantum signals and synchronization signals from different users into at least one fiber.

21. The method of claim 17, comprising detecting at a server a quantum data bit, activating a single photon detector to detect the data bit value, and identifying which synchronization receiver sent the bit.

* * * * *